(12) United States Patent
Shimizu et al.

(10) Patent No.: US 8,659,290 B2
(45) Date of Patent: Feb. 25, 2014

(54) MAGNETIC POLE DETECTION SYSTEM AND MAGNETIC POLE DETECTION METHOD

(75) Inventors: Tetsuya Shimizu, Kyoto (JP); Satoshi Hanaka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 351 days.

(21) Appl. No.: 13/076,190

(22) Filed: Mar. 30, 2011

(65) Prior Publication Data

US 2011/0248709 A1   Oct. 13, 2011

(30) Foreign Application Priority Data

Apr. 12, 2010   (JP) .................................. 2010-091106

(51) Int. Cl.
*G01R 33/02* (2006.01)

(52) U.S. Cl.
USPC ........................................................ 324/244

(58) Field of Classification Search
USPC ........................................................ 324/244
See application file for complete search history.

(56) References Cited

U.S. PATENT DOCUMENTS

| | | | |
|---|---|---|---|
| 5,004,982 A | | 4/1991 | Chaney et al. |
| 5,208,496 A | * | 5/1993 | Tozoni et al. ............... 310/12.09 |
| 5,325,056 A | * | 6/1994 | Shonowaki et al. ..... 324/207.21 |
| 5,430,373 A | | 7/1995 | Ichikawa et al. |
| 5,434,504 A | * | 7/1995 | Hollis et al. ............. 324/207.17 |
| 6,307,366 B1 | * | 10/2001 | Takeda ..................... 324/207.21 |
| 6,555,809 B2 | * | 4/2003 | Kenjo et al. ............... 250/231.14 |
| 8,129,984 B2 | * | 3/2012 | Hosek et al. ............. 324/207.24 |
| 2002/0105445 A1 | * | 8/2002 | Shirai et al. ....................... 341/7 |
| 2003/0076091 A1 | * | 4/2003 | Jiang et al. ............... 324/207.22 |
| 2004/0118758 A1 | | 6/2004 | Gordon-Ingram |
| 2004/0232234 A1 | | 11/2004 | Zvezdine et al. ............. 235/449 |
| 2008/0079319 A1 | * | 4/2008 | Okada et al. .................... 310/12 |
| 2009/0198394 A1 | * | 8/2009 | Kubo ............................... 701/19 |
| 2009/0278710 A1 | | 11/2009 | Shimizu ....................... 340/988 |

FOREIGN PATENT DOCUMENTS

| | | |
|---|---|---|
| JP | 63113915 U | 7/1988 |
| JP | 05118874 A | 5/1993 |
| JP | 2000352523 A | 12/2000 |
| JP | 2004-347600 | 12/2004 |
| JP | 2009216589 A | 9/2009 |
| JP | 2009-276827 | 11/2009 |
| WO | 0248653 A1 | 6/2002 |

OTHER PUBLICATIONS

Extended European search report dated Mar. 23, 2012 issued in corresponding European application 11158434.8 cites the U.S. patents, U.S. patent application publication and foreign patent documents above.
Japanese language office action dated Jan. 31, 2012 and its English language translation issued in corresponding Japanese application 2010091106 cites the foreign patent documents above.

* cited by examiner

*Primary Examiner* — Patrick J Assouad
*Assistant Examiner* — Demetrius Pretlow
(74) *Attorney, Agent, or Firm* — DLA Piper LLP (US)

(57) ABSTRACT

A magnetic sensor array including a plurality of magnetic sensors detects a phase regarding a magnetic pole of a magnetic pole array including magnetic poles of N and S arranged alternately. A pitch identification unit detects a pitch number of the magnetic pole currently being detected by the magnetic sensor array, in the magnetic pole array.

3 Claims, 4 Drawing Sheets

FIG. 4
| Hall element | Positional relationship between central line of detection head and pitch of magnetic pole |  |  |  |  |  |  |  |  |  |  |  |  |  |  |  |  |  |  |  |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| A | N | S | | | | S | N | S | N | S | N | | | | | N | S | | S | | |
| B | | N | S | | | | S | N | S | N | S | N | | | | | N | S | | S | |
| C | N | | N | S | | | | S | N | S | N | S | N | | | | | N | S | | S |
| D | | N | | N | S | | | | S | N | S | N | S | N | | | | | N | S | |
| E | | | N | | N | S | | | | S | N | S | N | S | N | | | | | N | S |
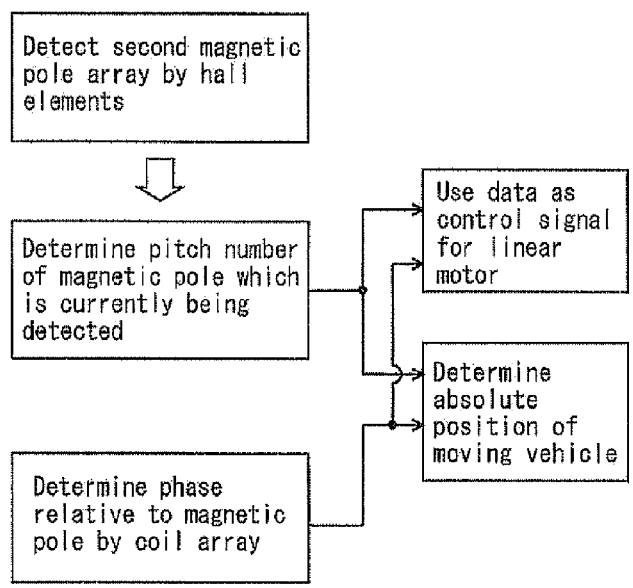
FIG. 5
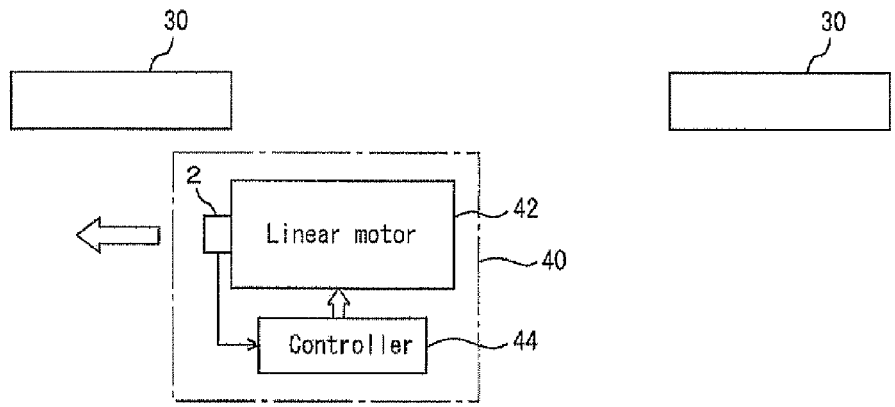
FIG. 6

MAGNETIC POLE DETECTION SYSTEM AND MAGNETIC POLE DETECTION METHOD

FIELD OF THE INVENTION

The present invention relates to a magnetic pole detection system and a magnetic pole detection method, e.g., used for detecting a position of a moving vehicle.

BACKGROUND ART

The inventors developed a system adopting a combination of a magnetic pole array including a plurality of magnetic poles arranged in a straight line, and a coil array including a plurality of coils for detecting a position based on the magnetic pole array (e.g., Patent Publication 1: JP2009-276827A). In the system, the magnetic poles are arranged at the same pitch such that magnetic poles of N and S are arranged alternately, i.e., the adjacent magnetic poles have the opposite polarities N and S. The coil array detects a phase based on the magnetic pole. In this approach, pitch numbers of the magnetic poles in the magnetic pole array cannot be determined from the coil array. In this regard, the signal from the coil array changes cyclically for each of the magnetic poles. Therefore, using this information, the number of cycles in which the signal from the coil array changed is counted to determine the pitch numbers of the magnetic poles. However, in the method, in the case where data of the pitch numbers of the magnetic poles is lost due to an instantaneous power failure or the like, restarting operation becomes difficult.

Detection of the pitch numbers of the magnetic poles of the magnetic pole array and detection of the phase relative to the magnetic pole can be used, e.g., for controlling a linear motor, in addition to detecting a position of a moving vehicle. For example, a linear synchronous motor is used as the linear motor, the pitch numbers of the magnetic poles of the magnetic pole array and the phase relative to the magnetic pole are detected, and feedback control is provided for the linear motor. In both of the control of the linear motor and position detection of the moving vehicle, if the pitch numbers of the magnetic poles in the magnetic pole array are found without counting cycles of the signal, control can be implemented without any significant troubles.

SUMMARY OF THE INVENTION

An object of the present invention is to make it possible to identify a pitch of a magnetic pole in a magnetic pole array without any data that requires storage of information such as a repeat number of cycles.

The present invention relates to a magnetic pole detection system including a magnetic pole array, a magnetic sensor array, a phase detection head, and a pitch identification unit. The magnetic pole array includes a plurality of magnetic poles of N and S arranged alternately. The magnetic sensor array includes a plurality of magnetic sensors for detecting a magnetic pole of the magnetic pole array. The phase detection head detects a phase based on one magnetic pole in the magnetic pole array. The pitch identification unit identifies a pitch number of one magnetic pole currently being detected by the magnetic sensor array, in the magnetic pole array, based only on current detection data regardless of historical detection data.

In the present invention, the pitch number of the magnetic pole is identified regardless of data detected in the past, e.g., data indicating how many cycles of magnetic poles have been counted. Therefore, the pitch number of the magnetic pole in the magnetic pole array can be detected reliably without being affected by a power failure or the like.

Preferably, the magnetic pole detection system further includes a plurality of marks arranged in parallel with the magnetic pole array and changing in units of magnetic poles of the magnetic pole array, and a mark sensor array including a plurality of mark detection sensors provided in parallel with the magnetic sensor array. The pitch detection unit identifies a pitch number of the magnetic pole in the magnetic pole array based on a series of signals from the mark detection sensors. In this manner, the pitch number of the magnetic pole can be identified based on a series of signals from the marks arranged in parallel with the magnetic pole array. Identification is not made based only on the signal from one mark, but made based on the series of signals. Therefore, it is acceptable that the amount of information from each mark is small. Thus, the magnetic pole pitch number can be identified using simple marks each having a small amount of information.

In particular, preferably, the marks are configured at least by the magnetic poles of the magnet array extended in a first direction perpendicular to a second direction in which the magnetic poles of the magnet array are arranged and magnetic poles of the magnet array un-extended in the first direction. In this manner, the mark can be configured based on whether or not the magnetic pole is extended or not. In the embodiment, by combining information indicating whether the magnetic pole is extended or not and the polarity of the magnetic pole, three types of the magnetic poles can be identified by the marks. Alternatively, without considering the polarity of the magnetic pole, there are only two types of marks indicating whether the magnetic pole is extended or not may be provided. In this case, the marks can be formed integrally with the magnetic pole array, and the marks can be configured simply. A portion detected by the magnetic sensor array in the magnetic pole array is referred to as the first magnetic pole array, and a portion detected by the mark sensor array is referred to as the second magnetic pole array. It can be considered that the first magnetic pole array and the second magnetic pole array are arranged in parallel with each other in the longitudinal direction of the magnetic pole array.

Preferably, the magnetic pole detection system further includes an offset correction unit for converting data regarding the pitch number of the magnetic pole in the magnetic pole array into a reference position of each magnetic pole, and converting the phase into a shift from the reference position to output an absolute position.

Further, the present invention relates to a method of detecting a magnetic pole of a magnetic pole array including magnetic poles of N and S arranged alternately with a magnetic sensor array including a plurality of magnetic sensors. The method comprises the steps of:

detecting a phase based on one magnetic pole in the magnetic pole array using a phase detection head; and identifying a pitch number of one magnetic pole currently being detected by the magnetic sensor array, in the magnetic pole array, using a pitch identification unit, based only on current detection data regardless of historical detection data. In the specification, description regarding the magnetic pole detection system is directly applicable to the magnetic pole detection method.

Preferably, a plurality of marks are arranged in parallel with the magnetic pole array, the marks change in units of magnetic poles of the magnetic pole array, and a mark sensor array including a plurality of mark detection sensors is provided in parallel with the magnetic sensor array. The identifying step includes identifying a pitch number of the mag-

BRIEF DESCRIPTION OF THE DRAWINGS

FIG. 4 is a table showing determination of a central position in a traveling direction of the phase detection head.

FIG. 5 is a flow chart showing an algorithm of detecting an absolute position according to the embodiment.

FIG. 6 is a block diagram showing a moving vehicle system utilizing the embodiment.

Hereinafter, an embodiment in the most preferred form for carrying out the present invention will be described. The scope of the invention shall be determined according to understanding of a person skilled in the art based on the description of the claims in consideration of the description of the specification and techniques known in this technical field.

MOST PREFERRED EMBODIMENT

Figure 1:
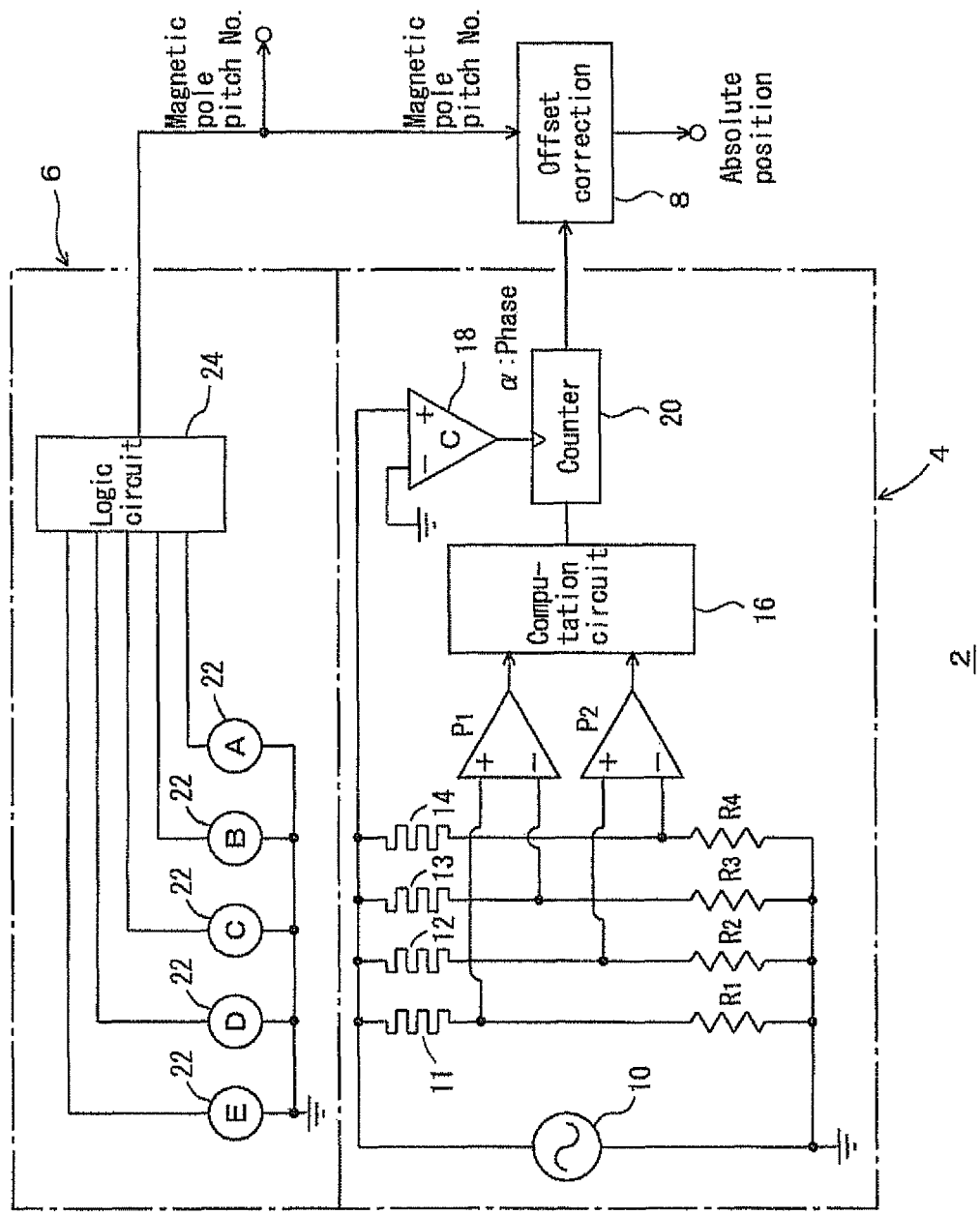
FIG. 1 is a block diagram showing a magnetic pole detector according to an embodiment.

FIGS. 1 to 6 show an embodiment and its application. FIG. 1 shows a magnetic pole detector 2. The magnetic pole detector 2 includes a phase detection head 4 for detecting a phase relative to each of magnetic poles of a magnetic pole array, and a pitch determination circuit 6 for determining, i.e., identifying a pitch number of a magnetic pole which is currently being detected regardless of historical detection data, and an offset correction unit 8. The phase detection head 4 includes an alternating current power supply 10 and a coil array made up of a plurality of, e.g., four coils 11 to 14. The coils 11 to 14 are connected to resistors R1 to R4, respectively. The coil array faces a magnetic pole array 30 shown in FIG. 3 to detect the phase based on the magnetic pole in the magnetic pole array. Reference numerals P1 and P2 denote operational amplifiers for collecting signals as shown in FIG. 1. $\alpha$ denotes a phase relative to each magnetic pole of the magnetic pole array. The output current of the alternating current power supply 10 is expressed by $\sin \omega t$, and two signals of $\sin \alpha \times \sin \omega t$ and $\cos \alpha \times \sin \omega t$ are obtained from the operational amplifiers P1, P2. These signals are processed by an operational amplifier circuit 16, e.g., by delaying the phase of the signal of $\sin \alpha \times \sin \omega t$ by $\pi/2$ to produce $\sin \alpha \times \cos \omega t$. Then, by adding $\sin \alpha \times \cos \omega t$ to $\sin \alpha \times \sin \omega t$, $\sin(\alpha + \omega t)$ is obtained by addition theorem. The coil array is an example of a magnetic sensor array, and the pitch determination circuit 6 is an example of a pitch identification unit.

A counter 20 counts a clock signal (not shown). For example, the counter 20 is reset when a zero crossing detector 18 or the like detects that the phase of the output current from the alternating current power supply 10 becomes 0. Though the zero crossing detector 18 has been mentioned for the purpose of explaining operation of the circuit, the zero crossing detector 18 may not be provided physically. For example, in the case where a D/A converter or the like is used for the alternating current power supply 10, the counter 20 should be reset when the input to the D/A converter becomes zero. By counting a period of time, e.g., from $\omega t = 0$ to $\alpha \pm \omega t = 0$, by the counter 20 based on $\sin \omega t$, $\sin(\alpha \pm \omega t) = 0$ or the like, $\alpha$ can be determined. $\alpha$ a is a phase relative to one magnetic pole. When the center of the coil array 14 faces one end of the magnetic pole, $\alpha$ becomes 0, and when the center of the coil array 14 faces the other end of the magnetic pole, for example, $\alpha$ becomes $2\pi$. $\alpha$ represents a position at the center of the coil array relative to the magnetic pole.

Though the coils 11 to 14 are provided for detection of the phase of the magnetic pole in the embodiment, a magnetic sensor array having a plurality other magnetic sensors such as hall elements, magneto-resistive effect sensors, magneto-impedance effect sensors arranged in an array may be provided. For example, in the case where a set of four magnetic sensors or a set of two magnetic sensors are arranged within the width of one magnetic pole (one pitch) of the magnetic pole array, the phase relative to each magnetic pole can be detected. The drive circuit shown in FIG. 1 is merely an example. Various other circuits are known as circuits for detecting the phase relative to the magnetic coil from the coil array.

The logic circuit 24 includes a plurality of hall elements 22. For example, the number of the hall elements 22 is 5. Alternatively, the number of the hall elements is 3, 7, 9, 1, or the like. For the purpose of explanation, the hall elements are denoted by alphabets A, . . . E. A plurality of the hall elements 22 are arranged in a line at the same pitch as the poles of the magnetic pole array. A combination of signals that can be determined uniquely depending on the position of the magnetic pole array is outputted. In the embodiment, though hall elements 22 can identify three types of states N, S, or no polarity in the embodiment, it is sufficient that the hall elements 22 can identify two types of the states, i.e., the presence or absence of the magnetic pole. Further, instead of the hall elements, magnetic sensors such as coils, magneto-resistive effect sensors, magneto-impedance effect sensors may be used. If the magnetic sensors such as the hall elements 22 are arranged densely in comparison with the magnetic poles of the magnetic pole array, e.g., at ½ pitch of the arrangement pitch the magnetic poles in the magnetic pole array, temporal missing of the pitch number at the time of passing a border between magnetic poles will not occur.

The combination of signals from the five hall elements A to E can be determined uniquely depending on the position on the coil array. The logic circuit 24 stores a table or the like showing correspondence between combinations of the signals from the individual hall elements A to E and positions on the magnetic pole array, and outputs the pitch number on the magnetic pole array, i.e., the number of the magnetic pole pitch. The table is an example of means for converting the combination of the signals from the hall elements A to E into the magnetic pole pitch. The pitch number of the magnetic pole is inputted to a controller 44 of a linear motor 42 shown in FIG. 6.

An offset correction unit 8 converts data indicating which magnetic pole array is currently being detected (in the case where a plurality of magnetic pole arrays are present) and the pitch number of the magnetic pole in the magnetic pole array into a reference position in each magnetic pole, e.g., an absolute position at an end of the magnetic pole. In the embodiment, this conversion is referred to as the offset correction. For example, the offset correction unit 8 stores an offset for each of the magnetic poles, or an offset for each magnet array. Assuming that the magnetic poles are arranged at an equal pitch in the magnet array, the width of the magnetic pole is stored. The phase $\alpha$ of the magnetic pole is represented by converting the ratio of the shift of the current position relative to the reference position of the magnetic pole which is currently being detected to the width of the magnetic pole into an angle in a range of 0° to 360°. Further, the width of the magnet pole can be determined based on a difference or the like between the offset of the magnet which is currently being detected and the offset of the next magnetic pole. The offset correction unit 8 outputs the absolute position based on the combination of the ID (data indicating which magnetic pole array is currently being detected in the case where a plurality of magnetic pole arrays are present), the pitch number of the magnetic pole which is currently being detected, and the phase α in the magnetic pole. Further, in the case where only the control of the linear motor is implemented, the offset correction unit 8 is not required.

Figure 2:
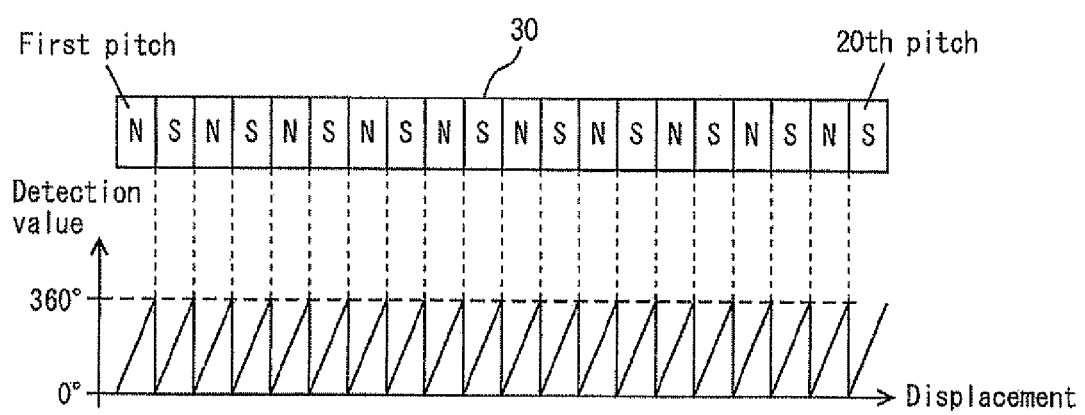
FIG. 2 is a diagram schematically showing a magnetic pole array and output from a phase detection head.

FIG. 2 is a graph showing the relationship between the arrangement of the magnetic poles in a magnetic pole array and output from a phase detection head. For example, the magnetic pole array 30 is made up of 20 magnetic poles. The magnetic poles are arranged at the same pitch such that magnetic poles of N and S are arranged alternately, i.e., the adjacent magnetic poles have the opposite polarities N and S. The magnetic poles has the same size in a direction in which the magnetic poles are arranged. The pitch between the magnetic poles, i.e., the interval between the central lines of the adjacent magnetic poles is referred to as the pitch of the magnetic pole. The phase detection head cannot recognize which magnetic pole is currently being detected, and outputs the phase relative to the magnetic pole which is currently being detected, as a phase, e.g., in a range of 0° to 360°.

Figure 3:
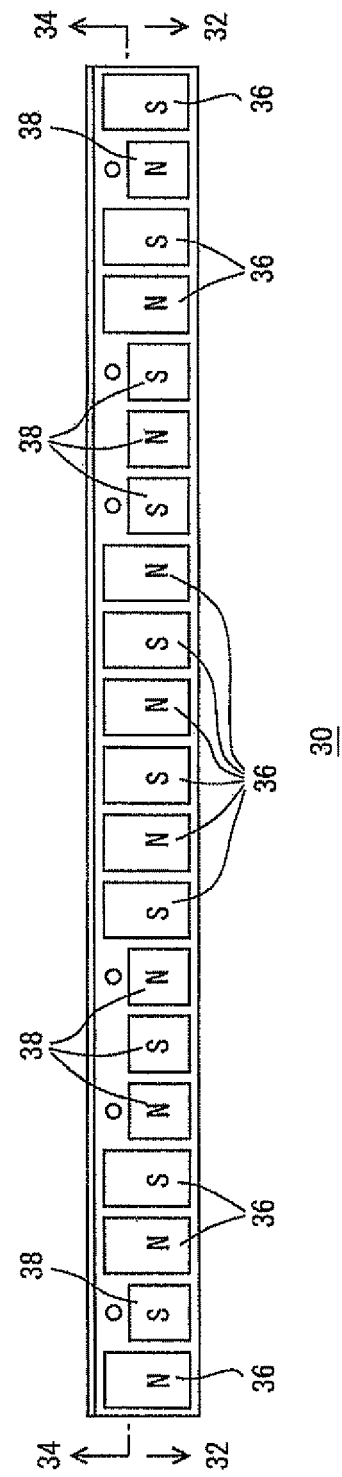
FIG. 3 is a plan view showing the magnetic pole array according to the embodiment.

FIG. 3 shows structure of a magnetic pole array 30. The magnetic pole array 30 is formed by combining long magnets 36 each having a large size in a direction perpendicular to the longitudinal direction of the array 30 and short magnets 38 each having a small size in the direction perpendicular to the longitudinal direction of the array 30. For example, the number of the magnets 36, 38 is 20 in total. The pitches at the magnetic poles are identified into three types of polarities, i.e., the polarity of N at the long magnet, the polarity of S at the long magnet, and no polarity at the short magnet. The short magnet having the reduced size does not show any polarity at the position where the long magnet protrudes. Identification of three types of polarities are used as magnetic marks. The hall elements are mark sensors for detecting these marks. If the types of five pitches are detected by the five hall elements of the pitch determination circuit, there are $3^5$ possible combinations of possible signals. After inappropriate signals are eliminated from the combinations, for example, several tens to 100 arrangements of the magnetic pole pitches can be identified. Therefore, the pitch number on the magnetic pole array can be identified uniquely based on the combination of the outputs from the five hall elements. It should be noted that even if the number of pitches in the magnetic pole array 30 is increased, the pitch number can be identified uniquely by increasing the number of hall elements.

The magnets 36, 38 of the magnet pole array 30 are arranged such that the adjacent magnets 36, 38 have the opposite polarities. Further, the long magnets 36 have the same size in the longitudinal direction of the array 30, and have different sizes in the direction perpendicular to the longitudinal direction of the array 30. It can be considered that the magnetic pole array 30 is formed by arranging a first magnetic pole array 32 and a second magnetic pole array 34 in parallel with each other in a moving direction of the moving vehicle. The first magnetic pole array 32 is the secondary side of the linear motor, and used for detecting the phase in the magnetic pole using the phase detection head. The second magnetic pole array 34 identifies the pitch number in the magnetic pole array using the magnetic sensors such as the hall elements. The first magnetic pole array 32 is present in a portion below a border line indicated by arrows shown in FIG. 3, and the second magnetic pole array 34 is present in a portion above the border line.

In this manner, the first magnetic pole array 32 and the second magnetic pole array 34 are provided in parallel with each other, and the three types of states, i.e., polarities of N, S, and no polarity in the second magnetic pole array 34 are detected, e.g., by the five hall elements. The second magnetic pole array 34 is formed by combining the long magnets 36 and the short magnets 38 to simplify the structure of the array 30. The magnetic poles used in the second magnetic pole array 34 and the magnetic poles used in the first magnetic pole array 32 may be separated physically.

If the length of the magnetic pole array 30 is increased much more, and the second magnetic pole array 34 is formed as one line array as shown in FIG. 3, it may become difficult to identify the pitch number of the magnetic pole. In such a case, the second magnetic pole array 34 should have two or more lines. For example, long magnets, middle magnets, and short magnets are arranged such that the second magnetic pole array 34 includes magnet poles arranged in two parallel lines. In the line adjacent to the first magnetic pole array 32, the long magnets and the middle magnets are considered as the same, and are distinguished from the short magnets. In the next line, the long magnets are distinguished from the middle magnets and the short magnets. In the embodiment, the magnetic pole array 30 is the secondary side of the linear motor. Alternatively, the magnetic pole array 30 may be provided separately from the secondary side of the linear motor, or may be used for recognizing the position of the moving vehicle regardless of the linear motor.

FIG. 4 shows a pattern of outputs from the hall elements A to E. The output pattern shows the relationship between the center of the phase detection head and the pitch number of the magnetic pole which faces the center of the detection head. Based on the layout of the second magnetic pole array 34 shown in FIG. 3, a signal for uniquely defining the magnet pole detected by the phase detection head as shown in FIG. 4 is obtained.

FIG. 5 shows processing in the embodiment. The pitch number of the magnetic pole in the magnet array is detected by the hall element array. In the coil array, the phase relative to the magnet pole which is currently being detected is determined. Based on combination of these items of data, the absolute position of the moving vehicle is determined. Further, based on the relationship between the pitch number of the magnetic pole and the phase, a control signal for controlling the linear motor is generated.

FIG. 6 shows a moving vehicle 40 utilizing the embodiment. A plurality of magnetic pole arrays 30 are arranged along a travel route of the moving vehicle 40. For example, a linear motor 42 is a linear synchronization motor or the like. Portions of the first magnetic pole arrays in the magnetic pole arrays 30 are used as the secondary side. By a magnetic pole detector 2, a relative position relative to the magnet pole array 30 is determined. Then, the linear motor 42 is controlled by the controller 44, and the absolute position of the moving vehicle 40 is determined. Further, data indicating which magnetic pole array is currently being detected is stored in a flash memory or the like to prevent loss of the data by a power failure. In the case of determining the absolute position at an arbitrary position, the interval between the adjacent magnetic pole arrays 30 is reduced. Further, in the case where only the control of the linear motor 42 is intended, calculation of the absolute position is not required. In the embodiment, though the linear motor 42 and the magnetic pole detector 2 are provided on the moving vehicle 40, alternatively, the linear motor 42 and the magnetic pole detector 2 may be provided on the ground, and the magnetic pole array 30 may be provided on the moving vehicle. The moving vehicle is not limited to a transportation vehicle such as an overhead traveling vehicle or a rail vehicle. For example, the moving vehicle may be a transfer apparatus, a head of a working machine or a transportation apparatus for transporting a workpiece.

In the embodiment, the following advantages are obtained.

(1) It is possible to determine the pitch number of the magnetic pole of the magnetic pole array 30 which is currently being detected, and provide feedback control for the linear motor.

(2) The magnetic pole array 30 can be configured simply by combining the long magnets 36 and the short magnets 38 for providing the first magnetic pole array 32 and the second magnetic pole array 34.

(3) In the case of determining the pitch number in the longer magnetic pole array, the second magnetic pole arrays 34 should be arranged in parallel with each other in two or more lines, or the number of magnetic sensors such as the hall elements should be increased.

It should be noted that the hall elements A to E may be arranged in a direction perpendicular to a direction in which magnetic poles of the magnet pole arrays are arranged, and a magnetic mark, an optical mark or the like having an amount of data corresponding to 5 bits may be provided for each of the magnetic poles. However, in this case; the marks realized simply by combining the long magnets 36 and the short magnets 36 need to be replaced by twenty types of marks inefficiently. The components such as the computation circuit 16, the counter 20, the logic circuit 24, the offset correction unit 8 or the like may be provided as discrete circuits. Alternatively, these components may be provided as computer structure made up of hardware and software.

DESCRIPTION OF THE NUMERALS

2: magnetic pole detector
4: phase detection head
6: pitch determination circuit
8: offset correction unit
10: alternating current power supply
11 to 14: coil
16: computation circuit
18: zero crossing detector
20: counter
22: hall element
24: logic circuit
30: magnetic pole array
32: first magnetic pole array
34: second magnetic pole array
36: long magnet
38: short magnet
40: moving vehicle
42: linear motor
44: controller
R1 to R4: resistor
P1, P2: operational amplifier

What is claimed is:

1. A magnetic pole detection system comprising:
a magnetic pole array including a plurality of magnetic poles of N and S arranged alternately, wherein the magnetic poles of N comprise two different size magnets and the magnetic poles of S comprise the same two different size magnets, and the sizes of the magnets vary in a direction perpendicular to a longitudinal direction of the magnetic pole array;
a magnetic sensor array including a plurality of magnetic sensors for detecting a magnetic pole of the magnetic pole array;
a phase detection head for detecting a phase regarding one magnetic pole currently being detected by the magnetic sensor array in the magnetic pole array according to a signal from the magnetic sensor array;
a pitch identification unit for identifying a pitch number of the magnetic pole currently being detected in the magnetic pole array, based only on current detection data regardless of historical detection data;
a plurality of marks arranged in parallel with the magnetic pole array, changing synchronously with the magnetic poles of the magnetic pole array; and
a mark sensor array including a plurality of mark detection sensors provided in parallel with the magnetic sensor array, wherein
the pitch detection unit identifies the pitch number of the magnet pole in the magnet pole array based on a combination of signals from the mark detection sensors, and
the marks are configured at least by the magnetic poles of the magnet array extended in the direction perpendicular to the longitudinal direction in which the magnet poles of the magnet array are arranged and magnetic poles of the magnet array un-extended in the perpendicular direction.

2. A magnetic pole detection system comprising:
a magnetic pole array including a plurality of magnetic poles of N and S arranged alternately;
a magnetic sensor array including a plurality of magnetic sensors for detecting a magnetic pole of the magnetic pole array;
a phase detection head for detecting a phase regarding one magnetic pole currently being detected by the magnetic sensor array in the magnetic pole array according to a signal from the magnetic sensor array;
a pitch identification unit for identifying a pitch number of the magnetic pole currently being detected in the magnetic pole array, based only on current detection data regardless of historical detection data;
a plurality of marks arranged in parallel with the magnetic pole array, changing synchronously with the magnetic poles of the magnetic pole array;
a mark sensor array including a plurality of mark detection sensors provided in parallel with the magnetic sensor array; and
an offset correction unit for converting data regarding the pitch number of the magnetic pole in the magnetic pole array into a reference position of each magnetic pole, and converting the phase into a shift from the reference position to output an absolute position,
wherein the pitch detection unit identifies the pitch number of the magnet pole in the magnet pole array based on a combination of signals from the mark detection sensors.

3. A method of detecting a magnetic pole of a magnetic pole array comprising magnetic poles of N and S arranged alternately with a magnetic sensor array including a plurality of magnetic sensors, wherein the magnetic poles of N comprise two different size magnets and the magnetic poles of S comprise the same two different size magnets, and the sizes of the magnets vary in a direction perpendicular to a longitudinal direction of the magnetic pole array, the method comprising the steps of:
detecting a phase regarding one magnetic pole currently being detected by the magnetic sensor array in the magnetic pole array by a phase detection head;

identifying a pitch number of the magnetic pole currently being detected in the magnetic pole array, by a pitch identification unit, based only on current detection data regardless of historical detection data;

arranging in parallel a plurality of marks with the magnetic pole array, changing synchronously the plurality of marks with the magnetic poles of the magnetic pole array;

providing a mark sensor array including a plurality of mark detection sensors in parallel with the magnetic sensor array; and identifying the pitch number of the magnet pole in the magnet pole array, by the pitch identification unit, based on a combination of signals from the mark detection sensors, wherein the marks are configured at least by the magnetic poles of the magnet array extended in the direction perpendicular to the longitudinal direction in which the magnet poles of the magnet array are arranged and magnetic poles of the magnet array un-extended in the first direction.

* * * * *